United States Patent Office 3,165,465
Patented Jan. 12, 1965

3,165,465
FLOCCULATION AND SETTLING OF LIQUID SUSPENSIONS OF FINELY-DIVIDED MINERALS
Charles L. Ray, Wheaton, and Robert E. Baarson, La Grange, Ill., assignors to Armour and Company, Chicago, Ill., a corporation of Delaware
No Drawing. Filed May 4, 1961, Ser. No. 107,635
8 Claims. (Cl. 210—53)

This invention relates to the flocculation and settling of liquid suspensions of finely-divided minerals, and more particularly to flocculating agents and processes by which coagulation and rapid settling of aqueous suspensions of finely-divided minerals are brought about, and the provision of filter aids for the same.

In the present practice involving the coagulation and settling of aqueous suspensions of finely-divided minerals, flocculating agents, such as guar gum, gelatin, carboxymethyl cellulose, and polyacrylamides, are employed. We have discovered that by mixing in said suspension a cationic flocculant, as hereinafter described, a synergistic effect is produced, bringing about very rapid settling and high clarity in a minimum of time and with a substantial saving in expense, and by employing a specific sequence in the adding of the flocculants to the suspension, a further beneficial effect is produced.

A primary object, therefore, of the invention is to provide a process in which flocculating agents are combined with cationic flocculants for the effective flocculation and settling of liquid suspensions of finely-divided minerals. A further object is to provide a process in which the flocculants are added in sequence for improved flocculation and settling. Yet another object is to provide a combination of flocculants for producing better flocculation and settling of liquid suspensions of finely-divided minerals, while at the same time reducing the time and cost of the separating operation. Other specific objects and advantages will appear as the specification proceeds.

In one embodiment of the invention, a commercial flocculating agent, such guar gum, gelatin, carboxymethyl cellulose, polyacrylamide, etc., is added to an aqueous suspension of finely-divided minerals, such as, for example, a water and kaolin clay suspension, and to the suspension is added a cationic flocculant, such as an aliphatic substituted quaternary ammonium compound or mixtures thereof, or a water-soluble salt of N-aliphatic trimethylene diamine, N-aliphatic-N,N',N'-tris (hydroxyalkyl) trimethylene diamine, and after mixing is transferred to a settling tank to allow settling, the clarified water being then removed in the overflow and the settled solids removed in the underflow.

The aliphatic substituted quaternary ammonium compound may have the formula $R_4NX$, wherein X is an acid-forming group and R is an aliphatic hydrocarbon group having from 1–22 carbon atoms, said compound being further characterized by the fact that at least one but not more than two of the R's is an aliphatic hydrocarbon group having from 8–22 carbon atoms.

Specific examples of the aliphatic substituted quarternary ammonium compounds which can be employed are the dimethyl or diallyl dialkyl quarternary ammonium compounds, such as dimethyl distearyl quarternary ammonium chloride (Arquad 2HT), dimethyl dicoco quaternary ammonium chloride (Arquad 2C), dimethyl disoya quaternary ammonium chloride, dimethyl dioleyl quaternary ammonium chloride, and diallyl distearyl quaternary ammonium chloride, or the alkyl trimethyl quaternary ammonium compounds, such as trimethyl soya quaternary ammonium chloride (Arquad S), and trimethyl tallow quaternary ammonium chloride (Arquad T) or mixtures thereof, such as Arquad S–2C or Arquad T–2C. For best results, we prefer to use Arquad 2HT or dimethyl dioleyl quaternary ammonium chloride.

Similarly, any N-aliphatic N,N',N'-tris (hydroxyalkyl) trimethylene diamine may be employed, but for best results we prefer to use N-tallow-N,N',N'-tris (2-hydroxyethyl)-trimethylene diamine (Ethoduomeen T/13).

In preparing the cationic flocculants, including the quaternary ammonium compounds and aliphatic trimethylene diamines, we prefer to employ as starting materials amines derived from fatty acids having from 8–22 carbon atoms, and preferably from mixtures of fatty acids as found in coco, soya or tallow.

In test procedures, such as in the clarification of a suspension of kaolin clay, we found that when any of the commercial flocculating agents, such as guar gum, carboxymethyl cellulose, and gelatin are employed, and where the cationic flocculants above described are separately employed, and the results recorded, the use of the cationic flocculant with the first-mentioned commercial flocculants gives results in speed of clarification, degree of clarification, and amount of settling far in excess of the additive values of the two types of flocculants when used separately.

It was also found that when a polyacrylamide flocculating agent is employed, and where the cationic flocculants above described are employed, the use of the cationic flocculant with the first-mentioned commercial flocculant offers a lower overall cost for the settling operation, with no significant loss of flocculation efficiency.

In the following examples, the referenced chemicals are designated as follows: Control No. 4, dimethyl dioleyl quaternary ammonium chloride; Control No. 5, diallyl dihydrogenated tallow quaternary ammonium chloride; Control No. 6, polyoxyethylated tallow triethylene diamine; and Control No. 7, dimethyl distearyl quaternary ammonium chloride.

*Example I*

In order to observe the flocculating, clarifying, and settling action in the minerals suspension system, 250 ml. graduated mixing cylinders were filled with the clay pulp and the flocculant solution was added to the cylinder by means of a pipette. The cylinder was gently inverted several times after the flocculant addition to insure complete mixing. This was followed by immediate observation of the relative size of the floccule formed, the settling rate of the interface formed by the flocculated solids and the water phase, and the relative clarity of the supernatant water.

In the present Example I, the graduated cylinders were filled with a 3% solids clay pulp. Each of the referenced chemicals (cationic flocculants) was added to the system at the rate of 12½ parts per million parts of pulp by weight. The cylinders were inverted gently five times, and the relative floc size, settling rate, and supernatant clarity were determined.

| Flocculant(s) | P.P.M. Added | Settling Rate, Milliliters/Minute | | | | | | | | Relative Clarity | Relative Floc Size |
|---|---|---|---|---|---|---|---|---|---|---|---|
| | | ½ | 1 | 1½ | 2 | 2½ | 3 | 4 | 5 | | |
| Untreated | | 4 | 12 | 24 | 36 | 44 | 60 | 76 | 96 | Very cloudy | |
| Control No. 4 | 12½ | 72 | 110 | 126 | 140 | 146 | 154 | 160 | 166 | Clear | Large. |
| Control No. 5 | 12½ | 64 | 96 | 108 | 140 | 152 | 168 | 174 | 180 | Slightly cloudy | Medium. |
| Control No. 6 | 12½ | 16 | 28 | 40 | 52 | 64 | 74 | 96 | 116 | do | Do. |
| Control No. 7 | 12½ | 18 | 34 | 52 | 66 | 82 | 94 | 114 | 130 | Cloudy | Do. |
| Gelatin | 12½ | 20 | 34 | 48 | 60 | 76 | 86 | 112 | 134 | Clear | Large. |
| Control No. 4+Gelatin | 6¼ of ea | 90 | 126 | 140 | 150 | 154 | 160 | 166 | 170 | do | Do. |
| Control No. 5+Gelatin | 6¼ of ea | 56 | 80 | 100 | 118 | 134 | 148 | 162 | 167 | do | Do. |
| Control No. 6+Gelatin | 6¼ of ea | 50 | 70 | 86 | 112 | 120 | 136 | 154 | 162 | do | Do. |
| Control No. 7+Gelatin | 6¼ of ea | 50 | 66 | 82 | 96 | 110 | 126 | 146 | 156 | do | Do. |

*Example II*

The testing procedure was as in Example I. The graduated cylinders were filled with a 3% clay pulp. The CMC was added to the system. This was followed by inverting the cylinder gently several times to insure complete mixing. The alkyl trimethyl ammonium chloride was next immediately added to the system at the rate of 1½ parts per million parts of pulp by weight. This was followed by several additional inversions of the cylinder to insure complete mixing. One test was conducted in which only CMC at the rate of 3⅛ parts per million was added. These results may be compared to those in Example I.

| Control No. Plus CMC | Mililiters Settled/Unit of Time (Min.) | | | | | | | | Relative Clarity | Relative Floc Size |
|---|---|---|---|---|---|---|---|---|---|---|
| | ½ | 1 | 1½ | 2 | 2½ | 3 | 4 | 5 | | |
| Untreated | 4 | 12 | 24 | 36 | 44 | 60 | 76 | 96 | Very cloudy | |
| 4 | 122 | 170 | 180 | 186 | 190 | 192 | 196 | 200 | Almost clear | Large. |
| 5 | 90 | 130 | 158 | 172 | 178 | 182 | 190 | 194 | do | Do. |
| 6 | 50 | 90 | 130 | 152 | 166 | 172 | 182 | 186 | do | Do. |
| 7 | 80 | 140 | 164 | 172 | 180 | 184 | 190 | 194 | do | Do. |
| CMC alone | 42 | 64 | 86 | 104 | 120 | 132 | 152 | 162 | do | Do. |

*Example III*

The testing procedure was as in Example I. The graduated cylinders were filled with a 5% clay pulp. In the first example, polyacrylamide (Separan NP20) alone was added to the system at the rate of 6¼ parts per million parts of pulp by weight, followed by inverting the cylinder several times and observation of the clarity and the settling rate. In the second example, Separan NP20 was added to the system at the rate of approximately 4¾ parts per million parts of pulp by weight followed by inverting the cylinder several times. Dimethyl dialkyl ammonium chloride was added at the rate of approximately 1½ parts per million parts of pulp by weight, for a total of 6¼ parts of flocculants. This was followed by several additional inversions of the cylinder to assure complete mixing, and observation of the clarity and settling rate.

| Flocculant(s) | P.P.M. | Milliliters Settled/Minute | | | | | | | | Relative Clarity | Relative Floc Size |
|---|---|---|---|---|---|---|---|---|---|---|---|
| | | ½ | 1 | 1½ | 2 | 2½ | 3 | 4 | 5 | | |
| Separan NP20 | 6¼ | 96 | 142 | 156 | 164 | 168 | 172 | 178 | 180 | Almost clear | Large. |
| Separan NP20 and Control No. 4 | 4¾ and 1½ | 90 | 138 | 152 | 160 | 164 | 168 | 175 | 178 | do | Do. |
| Untreated | | 4 | 10 | 14 | 20 | 24 | 30 | 40 | 52 | Very cloudy | Clear. |

*Example IV*

A further test was made similar to the procedure of Example I except that guar gum (Guartec) was used in place of the gelatin and was found to increase the settling rate of the suspended solids and to improve the clarity of the supernatant water. It was found that up to 50% of the Guartec that is required to provide a moderate settling rate and moderate clarity may be replaced with the referenced chemicals (cationic flocculants) to provide a synergistic settling rate and improved clarity. The graduated cylinders were filled with a 5% clay pulp. In the first test, guar gum (Guartec) was added to the system at the rate of 6¼ parts per million parts of pulp by weight, followed by inverting the cylinder several times and observation of the clarity and the settling rate. In the remaining tests, the Guartec was added at the rate of 4¾ or 3⅛ parts per million parts of pulp, and the cylinders were inverted several times. This was immediately followed by addition of the referenced chemicals at a rate sufficient to make a total of 6¼ parts of flocculant per million parts of pulp. The cylinders were again inverted several times to assure complete mixing, and the clarity and settling rates were observed.

| P.P.M. Guartec | Reference Chemicals | | Milliliters Settled/Minute | | | | | | | | Relative Clarity | Relative Floc Size |
|---|---|---|---|---|---|---|---|---|---|---|---|---|
| | Control No. | P.P.M. | ½ | 1 | 1½ | 2 | 2½ | 3 | 4 | 5 | | |
| Untreated | | | 3 | 8 | 14 | 18 | 24 | 28 | 40 | 50 | Very cloudy | |
| 6¼ | | | 24 | 54 | 78 | 98 | 116 | 128 | 142 | 154 | Slightly cloudy | Medium. |
| 4¾ | 4 | 1½ | 36 | 72 | 100 | 124 | 138 | 146 | 156 | 162 | Almost clear | Large. |
| 3⅛ | 4 | 3⅛ | 36 | 74 | 104 | 128 | 140 | 148 | 156 | 162 | do | Do. |

*Example V*

The testing procedure was as in Example I, except that a total of 9 parts of flocculant per million parts of pulp was added to the system.

| P.P.M. Guartec | Reference Chemicals | | Milliliters Settled/Minute | | | | | | | | Relative Clarity | Relative Floc Size |
|---|---|---|---|---|---|---|---|---|---|---|---|---|
| | Control No. | P.P.M. | ½ | 1 | 1½ | 2 | 2½ | 3 | 4 | 5 | | |
| 9 | | | 32 | 66 | 96 | 118 | 134 | 142 | 154 | 160 | Slightly cloudy | Large. |
| 6¾ | 4 | 2¼ | 54 | 110 | 134 | 146 | 152 | 158 | 164 | 168 | Almost clear | Do. |
| 4½ | 4 | 4½ | 62 | 122 | 140 | 150 | 156 | 160 | 166 | 170 | Clear | Do. |

*Example VI*

In the following test, finely-divided coal was mixed with kaolin clay in a 1:1 ratio by weight and pulped in water to 5% total solids. The testing procedure was as in Example I. The graduated cylinders were filled with coal-clay pulp. In the first example, a guar gum (Guartec F) was added to the system as the sole flocculant at a rate of 12½ parts per million parts of pulp, followed by inverting the cylinder several times and observation of the clarity and the settling rate. In the second example, a guar gum (Guartec F) was added to the system at a rate of 6½ parts per million parts of pulp, followed by inverting the cylinder several times. The diacetate salt of N-tallow trimethylene diamine was next added to the system at a rate of 6¼ parts per million parts of pulp, followed by several additional inversions of the cylinder to assure complete mixing and observation of the clarity and settling rate.

The time interval was recorded from the point of addition of the treated pulp to the filter until the last trace of free water on the filter cake disappeared.

| Flocculant(s) Used | P.P.M. | Seconds of Filtering To Obtain Moist Filter Cake |
|---|---|---|
| Blank (Untreated) | | 501 |
| Control No. 4 | 12½ | 332 |
| CMC and Control No. 4 | 6¼ of each | 303 |
| CMC | 12½ | 461 |
| Guartec and Control No. 4 | 6¼ of each | 263 |
| Guartec | 12½ | 357 |

While the commercial flocculating agent may be added after the cationic flocculant, or in some cases may be added in admixture with the cationic flocculant, best results were obtained where the cationic flocculant was added later. The cationic intensification of the flocculant is readily observed in the settling cylinder. Bulk size is increased, clarity is improved, settling rate is increased,

| Parts Flocculated per Million Parts of Pulp | | Settling Rate—Milliliters/Min. | | | | | | | | Relative Clarity | Relative Floc Size |
|---|---|---|---|---|---|---|---|---|---|---|---|
| Guartec F | Reference Chemical | ½ | 1 | 1½ | 2 | 2½ | 3 | 4 | 5 | | |
| 12½ | | 46 | 90 | 124 | 143 | 153 | 160 | 170 | 176 | Cloudy | Medium. |
| 6¼ | 6¼ | 96 | 142 | 156 | 162 | 168 | 172 | 178 | 181 | Clear | Large. |
| Untreated | | 2 | 6 | 8 | 18 | 24 | 30 | 42 | 54 | Cloudy | |

*Example VII*

In this test, a copper ore was ground to minus 200 mesh size and pulped in water to a solids content of 5% by weight. The graduated cylinders were filled with the copper slimes pulp, and the exact test procedure, flocculating agents, and flocculating agent addition rates as outlined in Example VI were followed.

and floc stability is apparently enhanced a great deal, especially at higher flocculant consumption rates. In a specific example in which guar gum was first added to the suspension, the cationic flocculant was then introduced with further mixing, and the cationic intensification of the initial flocculation provided by guar gum was readily observed in the settling cylinder. It is possible that where

| Parts Flocculant Per Million Parts Pulp | | Settling Rate—Milliliters/Minute | | | | | | | | Relative Clarity |
|---|---|---|---|---|---|---|---|---|---|---|
| Guartec F | Reference Chemical | ½ | 1 | 1½ | 2 | 2½ | 3 | 4 | 5 | |
| 12½ | | 126 | 174 | 186 | 194 | 196 | 200 | 204 | 207 | Slightly cloudy. |
| 6¼ | 6¼ | 168 | 186 | 195 | 198 | 202 | 204 | 206 | 209 | Clear. |
| Untreated | | 4 | 30 | 50 | 66 | 88 | 104 | 140 | 172 | Cloudy. |

*Example VIII*

In the following test, it was found that the combination of the referenced chemicals (cationic flocculants) with guar gum or carboxymethyl cellulose resulted in a reduction of filtering time even further than when these flocculants are used alone at an equivalent addition rate. In the tests, a 500 ml. graduated cylinder was filled with a 3% clay pulp, the indicated amount of flocculant was added to the cylinder, and the cylinder was inverted several times to assure complete mixing. In those cases where Control No. 4 was used in combination with CMC or Guartec, the CMC or Guartec was added first with mixing, and Control No. 4 was added separately with additional mixing. The treated pulp was immediately poured into a Buchner filter using Schleicher and Schuell filter paper No. 497. An aspirator was used for vacuum.

the cationic flocculant and guar gum are admixed prior to application, a reaction of sorts may occur as evidenced by increased turbidity in the flocculant make-up solution. While the nature of this desired reaction of sorts between the cationic flocculant and other commercial flocculants, such as guar, is not fully understood, it is believed that this reaction is at least in part responsible for the cationic intensification of the initial flocculation provided by such commercial flocculants. When the flocculants are added separately, with the cationic flocculant being added in the second stage, a more effective flocculation is accomplished.

In a test procedure with a coal-clay system, the synergistic effect between the cationic flocculant (referenced chemicals) and guar gum was evidenced when comparing settling rates between the use of the cationic flocculants used alone, the guar gum used alone, and the combinations of the cationics with guar gum.

While in the foregoing specification we have set forth in considerable detail an embodiment of the invention for the purpose of clearly showing the invention, it will be understood that such details may be varied widely by those skilled in the art without departing from the spirit of our invention.

We claim:

1. A process for flocculating and settling finely-divided minerals in liquid suspension comprising the steps of first mixing into said suspension a flocculant selected from the group consisting of a polyacrylamide, carboxymethyl cellulose, guar gum and gelatin and then mixing into said suspension a cationic flocculant selected from the group consisting of a quaternary ammonium compound totally substituted with aliphatic radicals, at least one of which is a long chain hydrocarbon radical, and a water-soluble salt of N-aliphatic trimethylene diamine.

2. A process for flocculating and settling finely-divided minerals in liquid suspension comprising the steps of first mixing with said suspension a flocculant selected from the group consisting of a polyacrylamide, carboxymethyl cellulose, guar gum and gelatin, and then mixing into said suspension a quaternary ammonium compound having the formula $R_4NX$ wherein X is an acid-forming group and R is an aliphatic hydrocarbon radical having from 1–22 carbon atoms and further characterized by the presence of at least one and no more than two aliphatic hydrocarbon radicals having 8–22 carbon atoms.

3. The process of claim 2 in which the quaternary ammonium compound is dimethyl dicoco ammonium chloride.

4. The process of claim 2 in which the quaternary ammonium compound is tallow trimethyl ammonium chloride.

5. The process of claim 2 in which the flucocculant first mixed into the suspension comprises guar gum.

6. A process for flocculating and settling finely-divided minerals in liquid suspension comprising the steps of first mixing into said suspension a flocculant selected from the group consisting of a polyacrylamide, carboxymethyl cellulose, guar gum and gelatin, and then mixing into said suspension a water-soluble salt of N-aliphatic trimethylene diamine.

7. The process of claim 6 in which the diamine is N-tallow-N,N',N'-tris (2-hydroxyethyl)-trimethylene diamine.

8. The process of claim 6 in which the flocculant first mixed into the suspension comprises guar gum.

References Cited in the file of this patent

UNITED STATES PATENTS

| | | |
|---|---|---|
| 2,315,734 | Ralston et al. | Apr. 6, 1943 |
| 2,509,261 | Carosella | May 30, 1950 |
| 2,862,880 | Clemens | Dec. 2, 1958 |
| 2,937,143 | Goren | May 17, 1960 |
| 2,970,158 | Levis | Jan. 31, 1961 |
| 3,020,231 | Colwell et al. | Feb. 6, 1962 |
| 3,055,827 | Wiley | Sept. 25, 1962 |

FOREIGN PATENTS

| | | |
|---|---|---|
| 551,627 | Canada | Jan. 14, 1958 |
| 528,842 | Belgium | May 31, 1954 |
| 589,543 | Canada | Dec. 22, 1959 |

OTHER REFERENCES

Surface Active Agents and Detergents, vol. II by Schwartz et al., Interscience Publishers, Inc., New York (1958), pp. 114 and 217.

Industrial & Engineering Chemistry (periodical), vol. 46, November 7, pages 1485 to 1490 (July 1954).